(12) United States Patent
Lee et al.

(10) Patent No.: US 10,056,187 B2
(45) Date of Patent: Aug. 21, 2018

(54) TRANS INDUCTOR AND POWER CONVERTER USING THE SAME

(71) Applicant: Hyundai Motor Company, Seoul (KR)

(72) Inventors: Dae Woo Lee, Incheon (KR); Si Hun Yang, Gyeonggi-do (KR); Jin Young Yang, Gyeonggi-do (KR); In Yong Yeo, Gyeonggi-do (KR); Byeong Seob Song, Gyeonggi-do (KR); Woo Young Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/353,085

(22) Filed: Nov. 16, 2016

(65) Prior Publication Data

US 2018/0061566 A1 Mar. 1, 2018

(51) Int. Cl.
| | |
|---|---|
| *H02P 1/00* | (2006.01) |
| *H01F 17/04* | (2006.01) |
| *H01F 38/42* | (2006.01) |
| *H02M 3/158* | (2006.01) |
| *H02M 7/44* | (2006.01) |
| *H01F 27/255* | (2006.01) |
| *H02P 6/08* | (2016.01) |
| *H01F 3/10* | (2006.01) |

(52) U.S. Cl.
CPC ........... *H01F 38/42* (2013.01); *H01F 27/255* (2013.01); *H02M 3/158* (2013.01); *H02M 7/44* (2013.01); *H02P 6/085* (2013.01); *H01F 3/10* (2013.01); *H02P 2201/07* (2013.01)

(58) Field of Classification Search
None
See application file for complete search history.

(56) References Cited

U.S. PATENT DOCUMENTS

| | | | | |
|---|---|---|---|---|
| 6,392,364 | B1 * | 5/2002 | Yamamoto | H05B 41/02 |
| | | | | 315/291 |
| 7,518,886 | B1 * | 4/2009 | Lai | H02P 8/12 |
| | | | | 363/17 |
| 2010/0277267 | A1 * | 11/2010 | Bogert | H01F 3/10 |
| | | | | 336/221 |

(Continued)

FOREIGN PATENT DOCUMENTS

| | | |
|---|---|---|
| JP | 2011-082205 A | 4/2011 |
| JP | 2012-212856 A | 11/2012 |
| JP | 2013-153132 A | 8/2013 |

(Continued)

*Primary Examiner* — Bentsu Ro
*Assistant Examiner* — Zemenay Truneh
(74) *Attorney, Agent, or Firm* — Mintz Levin Cohn Ferris Glovsky and Popeo, P.C.; Peter F. Corless

(57) ABSTRACT

A trans inductor having a powdery magnetic substance and a power converter using the trans inductor are provided. The trans inductor and the power converter reduce peak current flowing in an inverter power module (IGBT), improve inverter efficiency, reduce output RMS current (output effective current) and reduce capacitor consumption by applying a material with properties that are resistant against current saturation instead of a core material of a conventional trans inductor employed in a power converter. Accordingly, an inductance decreasing rate due to core saturation when high current is generated is improved and current flowing in a switch device is prevented from being abruptly increased.

7 Claims, 12 Drawing Sheets

(56) References Cited

U.S. PATENT DOCUMENTS

2013/0003423 A1\* 1/2013 Song ................. H02M 3/33584
363/21.02
2014/0268959 A1\* 9/2014 Frohman ............... H02M 7/797
363/98

FOREIGN PATENT DOCUMENTS

JP          2015-056997  A      3/2015
KR          10-1316125          10/2013

\* cited by examiner

|  | EXAMPLE 1 (TRANS INDUCTOR) | COMPARATIVE EXAMPLE 1 (SINGLE-PHASE INDUCTOR) | COMPARATIVE EXAMPLE 2 (INTERLEAVE INDUCTOR) |
|---|---|---|---|
| RMS CURRENT OF CAPACITOR | 40A | 81.6A | 45A |
| RIPPLE CURRENT OF HDC CONVERTER MODULE | 42A | 44A | 88A |

TRANS INDUCTOR AND POWER CONVERTER USING THE SAME

CROSS-REFERENCE TO RELATED APPLICATION

This application claims under 35 U.S.C. § 119(a) the benefit of priority to Korean Patent Application No. 10-2016-0108047 filed on Aug. 25, 2016, the entire contents of which are incorporated herein by reference.

BACKGROUND (a) Field of Disclosure

The present disclosure relates to a trans inductor and a power converter using the same, and more particularly, to a trans inductor and a power converter that improve system efficiency of eco-friendly vehicles such as a plug-in hybrid vehicle and an electric vehicle.

(b) Description of the Related Art

Recently, the emergence of global environmental problems has created an interest in eco-friendly vehicles. In particular, an increase in efficiency of an inverter that directly influences fuel efficiency has become a significant issue and a high-voltage direct current to direct current (DC-DC) converter (HDC) that boost a battery voltage to enhance a voltage input to an inverter to thereby improve efficiency of the inverter has been researched. Generally, an eco-friendly vehicle using an electric motor as a power source, (e.g., a plug-in hybrid vehicle or an electric vehicle) includes a battery as a power source of the electric motor, an inverter configured to convert output of the battery to drive the electric motor disposed between the battery and the electric motor and the HDC configured to boost a battery voltage to improve a voltage input to the inverter disposed between the battery and the inverter. For example, to enhance inverter efficiency for fuel efficiency improvement of a vehicle, an eco-friendly vehicle uses a battery boosting converter called an High-Voltage DC-DC converter (HDC to increase an inverter input voltage to reduce an input current.

In particular, a boosting converter (e.g., an HDC) uses a bi-directional buck-boost converter. Accordingly, a representative component that influences HDC performance is an inductor that determines ripple current. Examples of an inductor used in a conventional buck-boost converter include a general inductor, an interleave inductor and a trans inductor. Typically, a general inductor allows ripple current flowing in a smoothing capacitor (e.g., an inverter input capacitor) to increase and therefor a capacity of a capacitor is increased. Additionally, the size or costs also increase. An interleave inductor provides for a reduction in ripple current that flows into a capacitor to be reduced by half, however, ripple current that flows in an HDC converter module increases and the loss also increases.

Generally, a trans inductor uses ferrite as a material of a core thereof. For example, in a vehicle system that instantaneously generates high current, when a core formed of ferrite is used the core is saturated due to generation of high peak current and unique properties of a magnetic substance may be lost. When a conventional inductor is used in a power converter or the like to instantly generate a high current, high peak current is generated in a switching device (IGBT). Accordingly a capacitor with high capacitance is required due to high ripple current or a core is saturated and the unique properties of a magnetic substance are diminished.

FIG. 1 is an exemplary diagram illustrating a structure of a power converter using a general inductor according to the related art. FIG. 2 is an exemplary diagram illustrating a structure of a power converter using an interleave inductor according to the related art. FIG. 3 is an exemplary diagram illustrating a structure of a power converter using a ferrite core-type trans inductor according to the related art. FIGS. 1 to 3 illustrate exemplary structures for power conversion of a battery used as a power source of an electric motor for eco-friendly vehicles and illustrate connection states of an HDC including inductors 2, 12, and 22 and HDC converter modules 3, 13, and 23, batteries 1, 11, and 21, smoothing capacitors 4, 14, and 24, and inverter power modules 5, 15, and 25.

In particular, the power converter of FIG. 1 uses the general inductor 2 and a circuit structure except for an inductor is the same as the power converters of FIGS. 2 and 3. The ripple current that flows in the smoothing capacitor 4 doubles compared with the interleave inductor 12 and the ferrite core-type trans inductor 22 and capacitance is required to double to achieve an equivalent performance. In other words, when a general inductor is used in an HDC inductor of a power converter, the high-peak current is generated as high current flows. Accordingly, capacitance is required to increase and high-peak current generates high noise which reduces electromagnetic waves of vehicles and the lifetime of components.

Further, when the power converter of FIG. 2 uses the interleave inductor 12, capacitance of the smoothing capacitor 14 at an inverter input side may be reduced. However, high-peak current flows in the HDC converter module 13 which increases switching loss and noise and the electromagnetic waves of vehicles and lifetime of the components are adversely affected. As shown in the power converter of FIG. 3 the ferrite core-type trans inductor 22 are used when high current is instantly generated and as an inductor core is saturated the inductance is reduced. In other words, the current is abruptly increased in a switch device.

The above information disclosed in this section is merely for enhancement of understanding of the background of the disclosure and therefore it may contain information that does not form the prior art that is already known in this country to a person of ordinary skill in the art.

SUMMARY

The present disclosure provides a trans inductor and a power converter using the same. The peak current flowing in an inverter power module (IGBT) may be reduced, the inverter efficiency may be improved and the output RMS current may be reduced (e.g., output effective current. The capacitor consumption may be reduced by applying a material with properties that are strong against current saturation (i.e., properties that current saturation does not easily occur even when high current is instantly generated) instead of a core material of a conventional trans inductor used in a power converter to improve an inductance decreasing rate due to core saturation when high current is generated and to prevent an rapid increase in current flow in a switch device.

In an exemplary embodiment, a trans inductor may include a core formed by compressing powdery Hiflux. In addition, the core may include a first coil portion and a second coil portion that are wound at opposite sides to face each other.

In another exemplary embodiment, a power converter may include a battery configured to supply power to a high-voltage DC-DC converter (HDC) converter module configured to boost and output a voltage of the battery, and a trans inductor disposed between the battery and the HDC converter module and configured to reduce peak current that flows in the HDC converter module. The trans inductor may include a core formed of Hiflux. In addition, the power converter may further include a smoothing capacitor connected to an output port of the HDC converter module and configured to convert an output voltage of the HDC converter module into a DC voltage.

BRIEF DESCRIPTION OF THE DRAWINGS

The above and other features of the present disclosure will now be described in detail with reference to exemplary embodiments thereof illustrated the accompanying drawings which are given hereinbelow by way of illustration only, and thus are not imitative of the present disclosure, and wherein.

Figure 1:
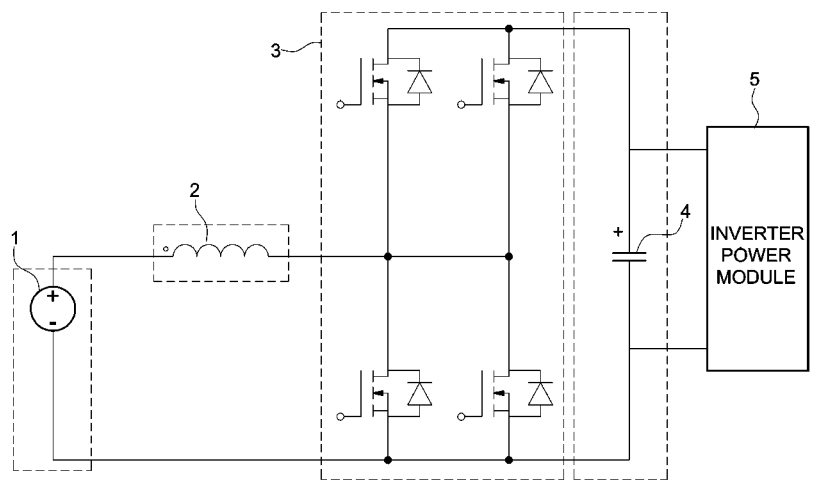
FIG. 1 is an exemplary diagram illustrating a structure of a power converter using a general inductor according to the related art.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

Hereinafter reference will now be made in detail to various exemplary embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other exemplary embodiments, which may be included within the spirit and scope of the disclosure as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 4:
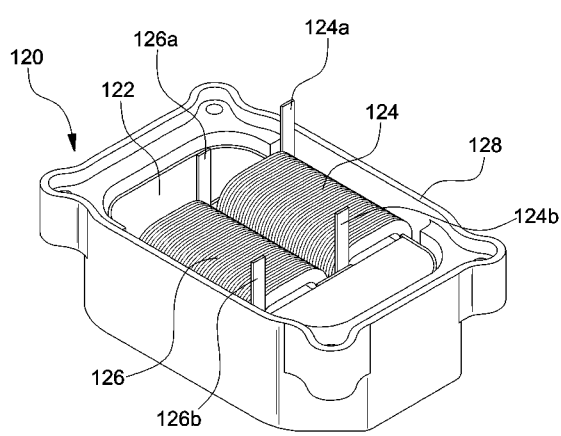
FIG. 4 is an exemplary diagram illustrating a trans inductor according to an exemplary embodiment of the present disclosure.
Figure 5A:
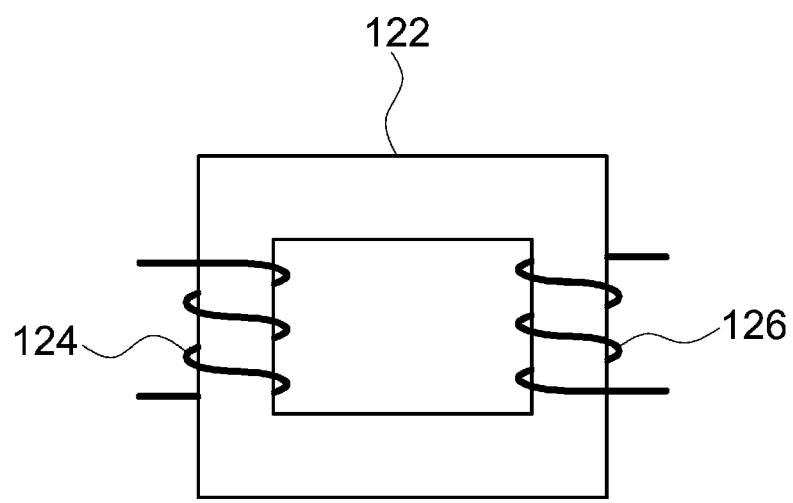
FIGS. 5A and 5B is an exemplary diagram illustrating a core and a coil portion of a trans inductor according to an exemplary embodiment of the present disclosure.
Figure 5B:
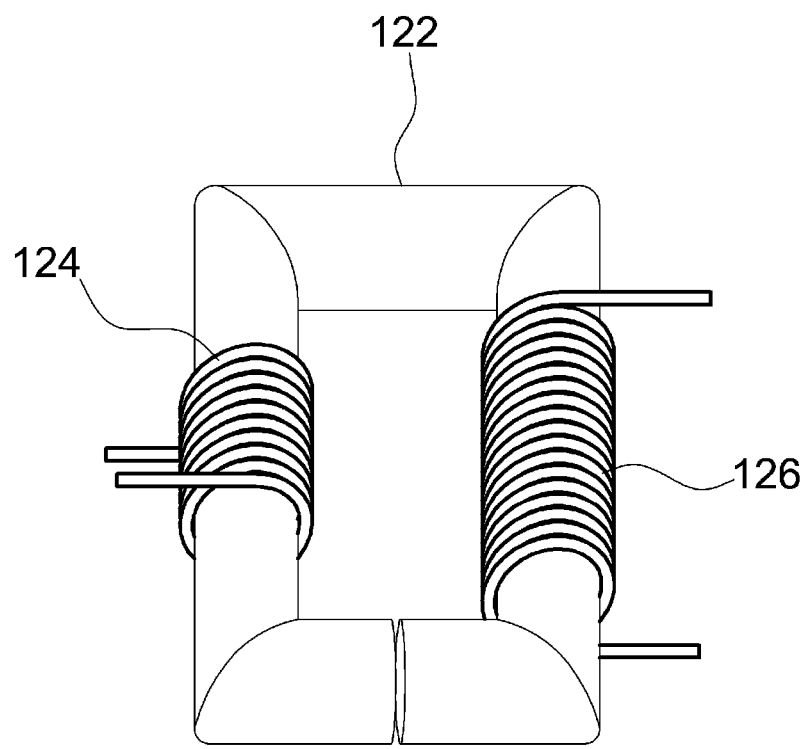

Referring to FIGS. 4 5A and 5B, a trans inductor 120 according to an exemplary embodiment of the present disclosure may be a transformer-type two-phase inductor and may include a core 122 installed in a housing 128 and coil portions 124 and 126 that are wound on the core 122. The core 122 may be formed of a powdery magnetic substance having properties that reduce current saturation and may be formed by compressing a powdery material in the form of a rectangular ring (e.g., or the like), for example, a rectangular ring with an opening formed in one side and, in this case, may have a circular cross section.

The coil portions 124 and 126 may include a first coil portion 124 and a second coil portion 126 wound at opposite sides of the core 122 and positioned to face each other. In other words, the first coil portion 124 and the second coil portion 126 may be wound at a portion of the core 122 except for the opening of the core 122. The core 122 may be formed via compression. In particular, a powdery magnetic substance having properties resistive against current saturation among powdery magnetic substances may be compressed and may be formed of Hiflux or the like.

The trans inductor 120 using a core formed of the powdery magnetic substance may include the core 122 formed of a material such as Hiflux, and may improve performance with respect to current saturation. For example, even when high current is instantly generated and flows inductance may be prevented from being reduced compared to a conventional trans inductor using a ferrite core. The trans inductor 120 according to an exemplary embodiments of the present disclosure may be formed of Hiflux to simplify a core shape and reduce a core size and weight compared to a conventional inductor.

Figure 6:
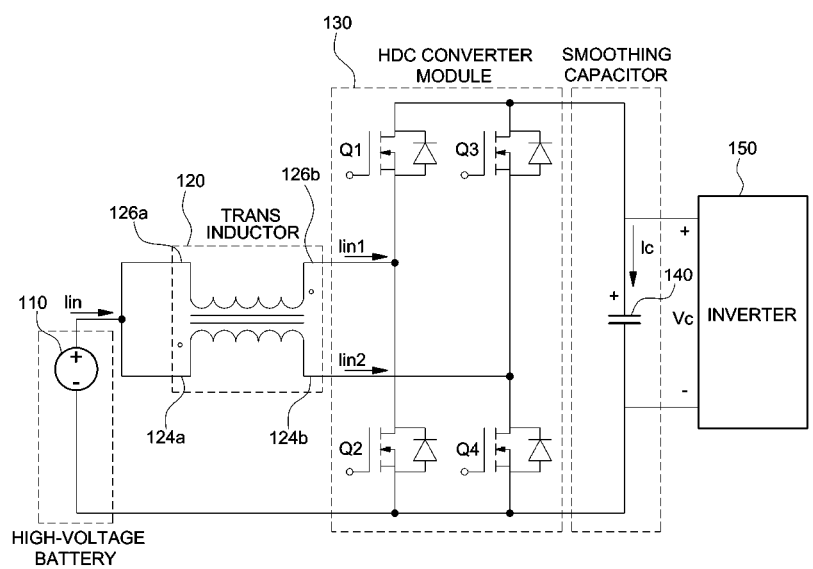
FIG. 6 is a exemplary diagram illustrating a power converter using a trans inductor according to an exemplary embodiment of the present disclosure.

FIG. 6 illustrates a power converter using a powdery magnetic substance core type trans inductor according to an exemplary embodiment of the present disclosure. FIG. 6 illustrates a structure for power conversion of a battery 110 that may be used as a power source of an electric motor for an eco-friendly vehicle and may provide a connection state of an HDC. For example, the connection state of the HDC may include the trans inductor 120 and an HDC converter module 130, the battery 110 configured to supply power, a smoothing capacitor 140, and an inverter power module 150 (e.g., an inverter). The power converter may be configured to increase an input voltage Vc of the inverter power module 150 through the trans inductor 120, the HDC converter module 130, and the smoothing capacitor 140.

The inverter power module 150 may be configured to convert output of the battery 110 to drive an electric motor and may be disposed between the battery 110 and an electric motor (not shown). The HDC for boosting a voltage of the battery 110 to increase an input voltage of the inverter power module 150 may be disposed between the battery 110 and the inverter power module 150. The smoothing capacitor 140 may be disposed between the HDC converter module 130 and the inverter power module 150. The battery 110 may be a lithium high-voltage battery that is installed as motor power (e.g., power source) within a hybrid vehicle, an electric vehicle, and may have an input voltage in the range of about 100 V to 400 V.

The trans inductor 120 may be an interleave type inductor with a transformer structure and may be disposed between the battery 110 and the HDC converter module 130. The ripple current that flows in the smoothing capacitor 140 may be reduced and may reduce the capacitance of the capacitor compared with a general single-phase inductor due to simultaneous action of leakage inductance and magnetization inductance. The peak current flowing in switch devices Q1, Q2, Q3, and Q4 of the HDC converter module 130 may be reduced to improve efficiency compared to a conventional interleave inductor. In other words, when high current is instantly generated and flows, the trans inductor 120 may prevent saturation of a powdery magnetic substance core (i.e., Hiflux core) and the properties of the magnetic substance may be maintained and may prevent a sudden reduction in inductance. Accordingly, the current that flows in the HDC converter module 130, and the smoothing capacitor 140 connected to an output side of the trans inductor 120 may be prevented from a rapid or sudden increase.

The trans inductor 120 may be configured to include a terminal 124a of the first coil portion 124, connected to a side of the battery 110, and may be set as a dot (e.g., a start point for winding a coil around a core) and a terminal 126b of the second coil portion 126, connected to a side of the HDC converter module 130, may be a dot. Accordingly, the trans inductor 120 may reduce ripple current that flows in the smoothing capacitor 140. For example, the trans inductor 120 may be formed using the core 122 formed of a powdery magnetic substance with properties that resistive against current saturation. In particular, even when high current is instantly generated, the core 122 may not be saturated and the switch devices in a circuit may be protected. The inverter efficiency may be improved and thermal characteristics may be improved. Accordingly, a power converter employing the trans inductor 120 may be protected.

Additionally, the HDC converter module 130 may be configured to boost and output a voltage of the battery 110 by operating each of the switch devices Q1, Q2, Q3, and Q4. An inverter input voltage Vc may be increased to decrease an average current that flows through the inverter power module 150. Accordingly inverter efficiency may be increased. The smoothing capacitor 140 may be connected in parallel to an output port of the HDC converter module 130. Further, the smoothing capacitor 140 may continuously smooth discontinuous current and voltage and may be configured to convert an output voltage of the HDC converter module 130. In other words an inverter input voltage Vc may be converted into a DC voltage. The inverter power module 150 may be configured to drive a vehicle motor (not shown) connected to an inverter output port through an operation of a switch device.

Figure 7:
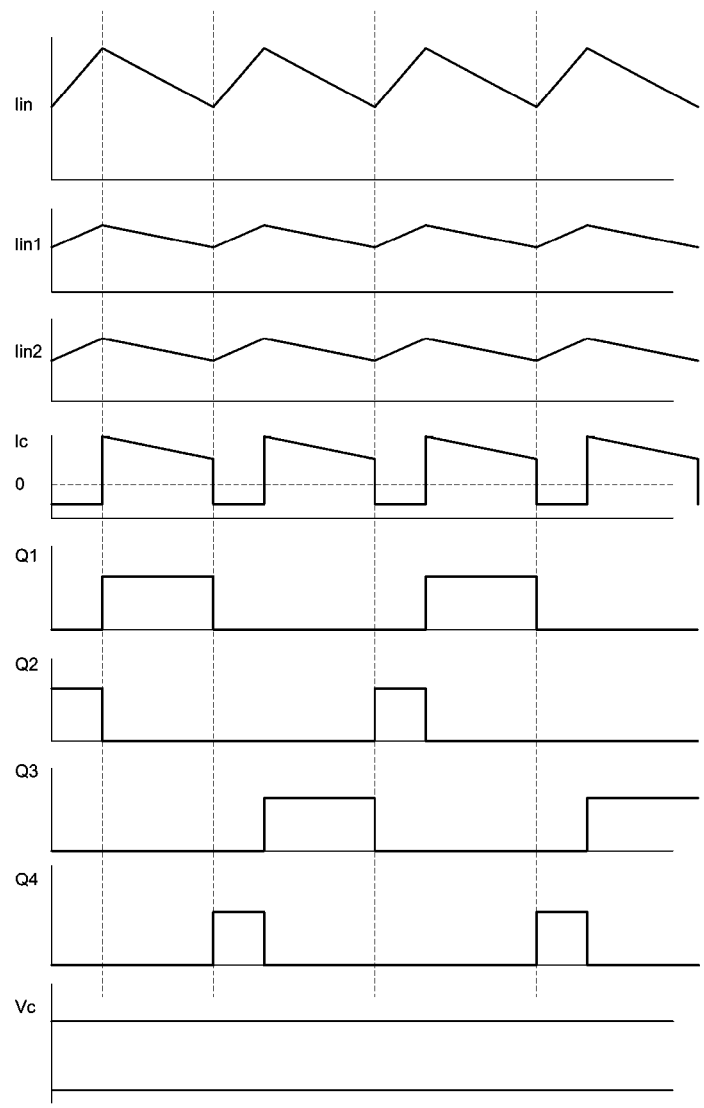
FIG. 7 is an exemplary diagram illustrating current and voltage applied to each component, and an operation of a switch device according to input current of a power converter according to an exemplary embodiment of the present disclosure.

The power converter with the aforementioned configuration may be configured to provide current and voltage applied to each component and an operation of a switch device according to input current, as illustrated in FIG. 7. FIG. 7 illustrates current Iin1 and Iin2 input to the HDC converter module 130 through the trans inductor 120, current Ic applied to the smoothing capacitor 140, an on/off operation of the switch devices Q1, Q2, Q3, and Q4 of the HDC converter module 130, and an output voltage Vc of the smoothing capacitor 140, i.e., an inverter input voltage Vc when the battery 110 of the power converter is configured to output input current Iin.

Hereinafter, one or more exemplary embodiments of the present disclosure will be described in detail with reference to the following examples. However, these examples are not intended to limit the purpose and scope of the one or more embodiments of the present disclosure.

EXAMPLE 1

A transformer-type two-phase inductor (a trans inductor) configured to include two coil portions formed by winding wires at opposite sides of a Hiflux core formed by compressing Hiflux powder. The Hiflux powder is compressed in the form of a rectangular ring and connected between a lithium battery of about 200 V and an HDC converter module. A capacitor is connected to an output port of the HDC converter module to design a circuit formed by omitting an inverter power module from the structure of FIG. 6.

COMPARATIVE EXAMPLE 1

A single-phase inductor is prepared and connected between a lithium battery of about 200V and an HDC converter module. Then, a capacitor is connected to an output port of the HDC converter module to design a circuit formed by omitting an inverter power module from the structure of FIG. 1. The capacitor includes a substantially similar capacitance as the capacitor used in Example 1 above. The single-phase inductor has a substantially similar size as the inductor used in Example 1 above.

COMPARATIVE EXAMPLE 2

Figure 2:
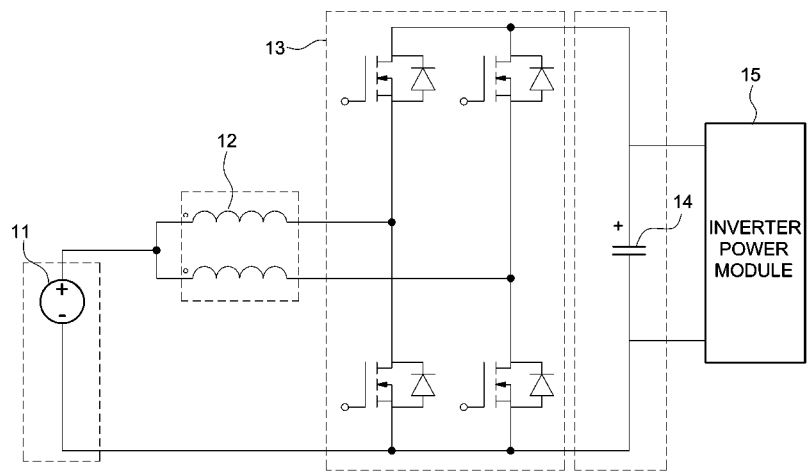
FIG. 2 is an exemplary diagram illustrating a structure of a power converter using an interleave inductor according to the related art.

An interleave inductor formed by connecting two single-phase inductors is prepared and connected between a lithium battery of about 200 V and an HDC converter module. Then, a capacitor is connected to an output port of the HDC converter module to design a circuit formed by omitting an inverter power module from the structure of FIG. 2. The capacitor mhas a substantially similar capacitance as the capacitor used in Example 1 above and the interleave inductor has a substantially similar size as the inductor used in Example 1 above.

COMPARATIVE EXAMPLE 3

Figure 3:
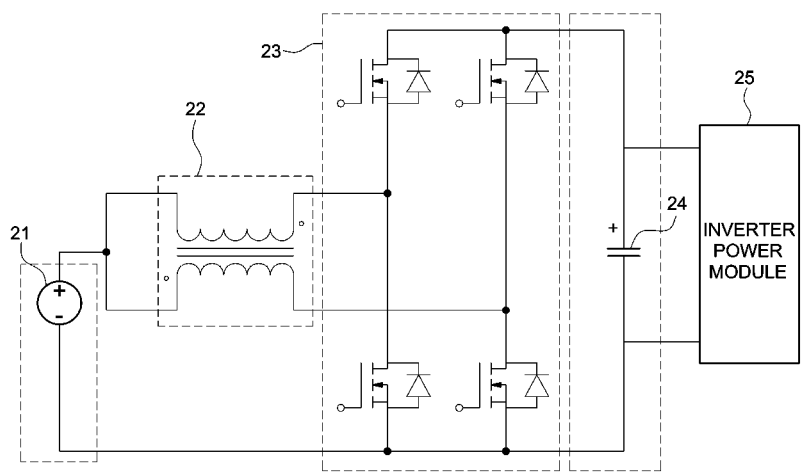
FIG. 3 is an exemplary diagram illustrating a structure of a power converter using a ferrite core-type trans inductor according to the related art.

A transformer-type two-phase inductor (a trans inductor) formed by winding wires at opposite sides of a ferrite core to form two coil portions may be connected between a lithium battery of about 200 V and an HDC converter module. Then a capacitor may be connected to an output port of the HDC converter module to design a circuit formed by an omission of an inverter power module from the structure of FIG. 3. The capacitor may have substantially the same capacitance as the capacitor used in Example 1 above and the inductor may have substantially the same size as the inductor used in Example 1.

EXPERIMENTAL EXAMPLE 1

Figures 8, 9:
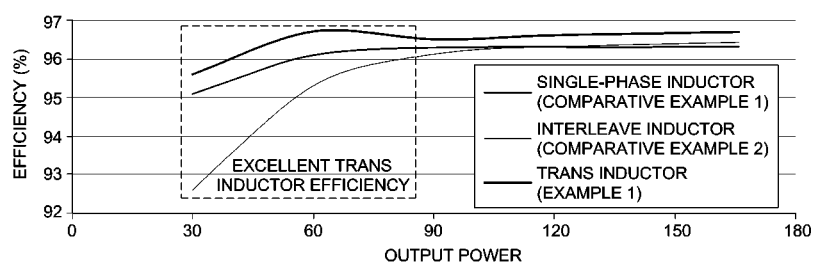
FIG. 8 is an exemplary diagram showing experimental results showing an improving effect of RMS current of a capacitor and ripple current of an HDC converter module in a power conversion circuit using a trans inductor according to an exemplary embodiment of the present disclosure.
FIG. 9 is an exemplary diagram showing experimental results showing inductor efficiency according to output power of a power conversion circuit using a trans inductor according to an exemplary embodiment of the present disclosure.

In the circuits of Example 1 and Comparative Examples 1 and 2, Root-mean-square (RMS) current of each capacitor and ripple current of each HDC converter module are measured. Accordingly, the measurement results are shown in FIG. 8. Inductor efficiency of each circuit according to output power of each circuit is shown in FIG. 9.

EXPERIMENTAL EXAMPLE 2

Figure 10:
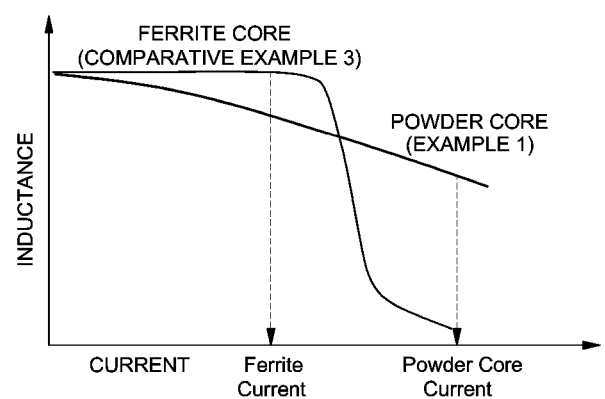
FIG. 10 is an exemplary graph showing experimental results showing inductance improving effect of a trans inductor according to an exemplary embodiment of the present disclosure.

In particular, the on/off operations of a switch device in a circuit may be configured to be adjusted under the substantially similar conditions. The voltage and current applied to the trans inductor of Example 1 and voltage and current applied to the trans inductor of Comparative Example 3 are measured to calculate inductance of each inductor, and the calculation result is shown in FIG. 10.

As seen from FIG. 8, RMS current of a capacitor, measured in the circuit of Example 1, has value less than the RMS current of a capacitor, measured in the circuits of Comparative Examples 1 and 2. Accordingly, the capacitor size and capacitance may be reduced in the circuit of Example 1. Additionally, the ripple current of the HDC converter module, measured in the circuit of Example 1, has a value less than the ripple current of the HDC converter module, measured in the circuits of Comparative Examples 1 and 2. Accordingly, efficiency of a switch device may be increased and heating may be reduced in the circuit of Example 1.

As seen from FIG. 9, inductor efficiency with respect to output power of Example 1 is greater than the inductor efficiency of Comparative Examples 1 and 2. In particular, an efficiency difference is greater in a low-output period indicated by dotted lines that corresponds to a main usage region in a vehicle fuel efficiency mode. Additionally, as seen from FIG. 10, inductance of the trans inductor of Comparative Example 3 is rapidly reduced when input current increases, and inductance of the trans inductor of Example 1 is gradually reduced when input current increases.

Figure 11:
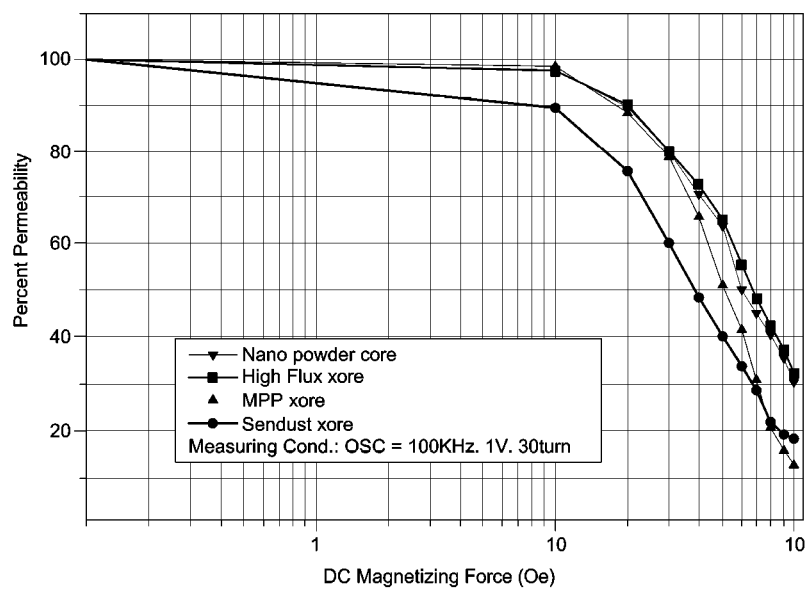
FIGS. 11 and 12 are exemplary graphs illustrating experimental results showing capability of maintaining of permeability of a Hiflux core according to exemplary embodiments of the present disclosure.
Figure 12:
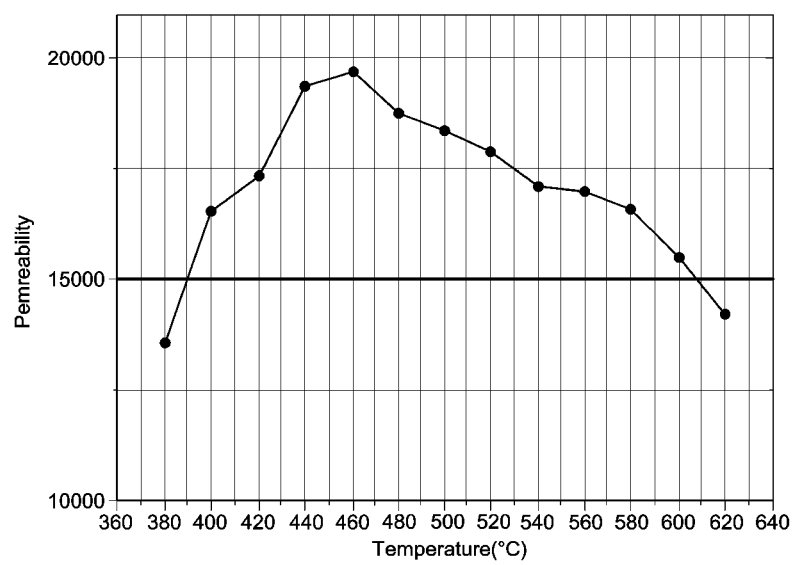

FIGS. 11 and 12 are exemplary graphs illustrating the results of experiments that show the ability to maintain permeability of a Hiflux core according to exemplary embodiments of the present disclosure. As seen from FIG. 11, permeability according to DC current (e.g., intensity of DC magnetic field) of a Hiflux core may be improved compared with core formed of different materials. As shown in FIG. 12, permeability based on to temperature change of a Hiflux core may be improved compared with core formed of different materials.

Due to use of the trans inductor according to the exemplary embodiments of the present disclosure, RMS current configured to flow in a smoothing capacitor of an input side of an inverter may be reduced. Accordingly, the size and capacitance of capacitor components may be reduced. In addition, ripple current applied to an HDC converter module may be reduced and the switch device lifespan may be increased. Further, inductor saturation may be prevented and noise may be reduced.

The disclosure has been described in detail with reference to exemplary embodiments thereof. However, it will be appreciated by those skilled in the art that changes may be made in these exemplary embodiments without departing from the principles and spirit of the disclosure, the scope of which is defined in the appended claims and their equivalents.

What is claimed is:

1. A power converter comprising:
    a battery configured to supply power to a high voltage direct current to direct current (DC-DC) converter (HDC) converter module,
    wherein the high-voltage DC-DC converter (HDC) converter module is configured to boost and output a voltage of the battery; and
    a trans inductor disposed between the battery and the HDC converter module and is configured to reduce peak current flowing in the HDC converter module,
    wherein the trans inductor includes a core formed of Hiflux, a first coil portion and a second coil portion that are wound on the core at opposite sides of the core that are positioned to face each other.

2. The power converter of claim 1, further comprising: a smoothing capacitor coupled to an output port of the HDC converter module and configured to convert an output voltage of the HDC converter module into a DC voltage.

3. A method for operating a power convertor, comprising:
    configuring by a controller, a high-voltage direct current to direct current (DC-DC) converter (HDC) converter module that includes the a inductor and a battery configured to supply power to a smoothing capacitor and an inverter power module; and adjusting the power converter to increase an input voltage of the inverter power module through a trans inductor, the HDC converter module, and the smoothing capacitor, wherein the trans inductor includes a core formed of Hiflux, a first coil portion and a second coil portion that are wound on the core at opposite sides of the core that are positioned to face each other, wherein the trans inductor is disposed between the battery and the HOC converter module and is configured to reduce peak current flowing in the HOC converter module.

4. The method of claim 3, further comprising:

adjusting the battery output voltage to drive an electric motor, wherein the power convertor module is disposed between the battery and an electric motor.

5. The method of claim 3, wherein the HDC configured to boost a voltage of the battery to increase an input voltage of the inverter power module is disposed between the battery and the inverter power module.

6. The method of claim 3, wherein the smoothing capacitor is disposed between the HDC converter module and the inverter power module.

7. The method of claim 3, wherein the battery is a lithium high-voltage battery and has an input voltage in the range of about 100 V to 400 V.

* * * * *